April 21, 1942.  W. G. DAVENPORT  2,280,520
DRAG SCRAPER BUCKET
Filed Aug. 22, 1939

WITNESS:
Rob't W. Mitchel

INVENTOR
William G. Davenport
BY
Augustus B. Stoughton
ATTORNEY.

Patented Apr. 21, 1942

2,280,520

UNITED STATES PATENT OFFICE 2,280,520

DRAG SCRAPER BUCKET

William G. Davenport, Philadelphia, Pa., assignor to Beaumont Birch Company, Philadelphia, Pa., a corporation of Pennsylvania Application August 22, 1939, Serial No. 291,294

4 Claims. (Cl. 37—147)

One object of my invention is to provide a drag scraper bucket which is cable-operated and which is double edged so as to be capable of digging on either edge.

A more specific object of my invention is to attach the cable or chain by which the scraper is pulled forward at such a low point that the scraper will dig evenly along the entire lower edge into the material to be conveyed until the scraper has a full load and will then ride or float over the surface of the material conveying its load therein. The scraper will operate in this efficient way no matter which of its edges is down.

For a further exposition of my invention, reference may be had to the annexed drawing and specification at the end whereof the novel features of my invention will be specifically pointed out and claimed:

Figure 2:
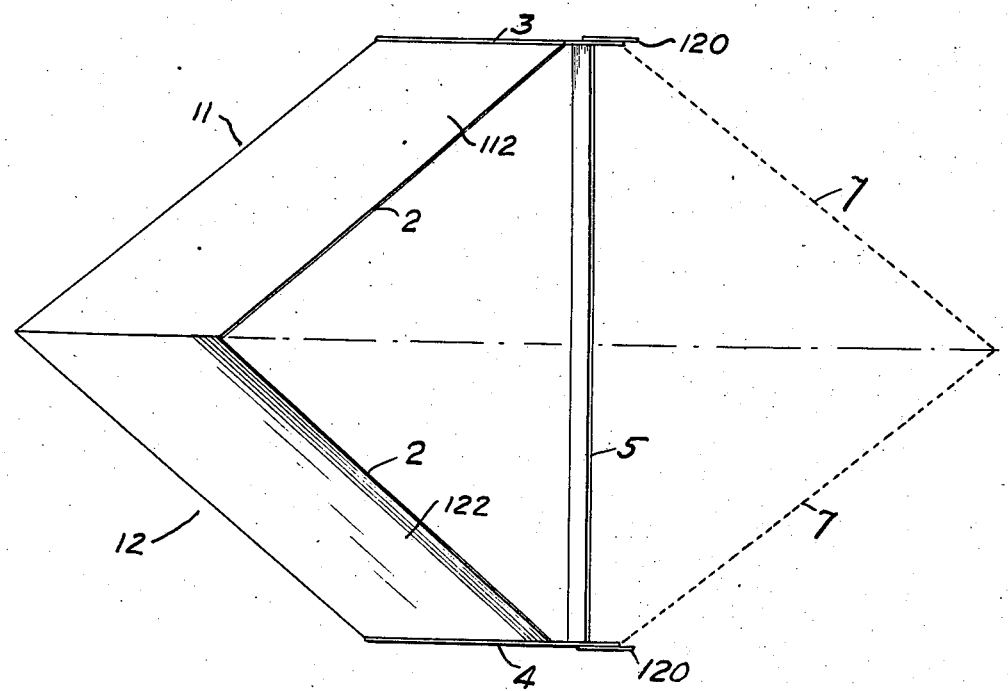
Fig. 2 is a top plan view of my device.
Figure 1:
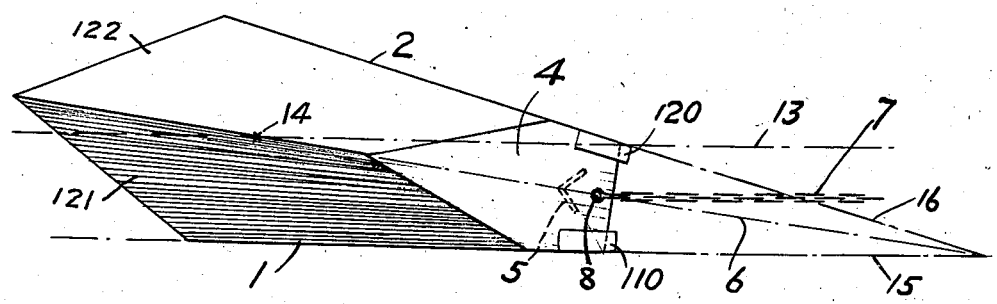
Fig. 1 is a side elevation of my device with diagrammatic lines added.

In that embodiment of my invention selected among others for illustration in the drawing and description in the specification I have shown my device as a scraper bucket made up of a pair of forwardly diverging wings or arms (each designated as a whole as 11 or 12) and having converging digging edges 1 and 2, the planes of which converge toward each other at the front end of the machine as is shown in Fig. 1 by the diagrammatic lines 15 and 16 which lines represent the planes passing through the digging edges 1 and 2. The wing or arm 11 consists of an upper plate 112 and an unnumbered plate not shown in the drawing. The arm or wing 12 consists of an upper plate 122 and a lower plate 121. These upper and lower plates cause the arms or wings 11 and 12 to have a transverse cross-section in the shape of a V lying on its side. The scraper is provided at its sides with side plates 3 and 4, which are braced apart by a bail 5 whose center is located in the center line of the scraper. As seen in Fig. 1, plane 6 bisects the angle between planes 15 and 16 which pass through the lower and upper cutting edges 1 and 2, respectively. The location of the hitching points 8 and the bail 5 is determined by the point in the line where plane 6 intersects the side plates, which point is half-way between a plane through one cutting edge and a parallel plane through the center of gravity. This is more specifically set forth hereinafter. The side plates 3 and 4 may be provided with teeth 110 and 120. A scraper is pulled forward by means of a cable 7 which has two diverging reaches which are attached to the side plates 3 and 4 at points 8, which are located in substantially the following position: A plane 13 is passed through the center of gravity 14 of the scraper horizontal or parallel to whichever edge 1 or 2 happens to be down. Point 8 is then located at equal distances from this plane 13 which passes through the center of gravity 14 and from a plane 15 forming a continuation of the lower edge, in this instance 1.

From the foregoing it will be seen that the drag scraper is pulled by the cable 7 in the customary manner, but because of the location of point 8 an ideal condition exists in that there is a low hitch point no matter which edge 1 or 2 is digging. This low hitch point causes the scraper to dig the load on an even keel without the front digging in. In other words, there is an even digging-pressure along the entire lower or operating edge. This hitch point automatically takes a correct position no matter which edge is digging.

It is believed that the operation of my device will be obvious from the foregoing but, for the purpose of differentiating my device from the prior art devices, a short description of its operation may be given as follows: Drag scraper buckets of this type have a tendency to topple over sideways when being pulled along a side hill. Since such drag scraper buckets are large and heavy pieces of machinery, a large crew of men or a large crane or like lifting device are necessary to right them. Neither such a crew of men nor such a crane or lifting device are generally available at the place of use of such drag scraper buckets. Due to the low hitch point or the location of the connection between the diverging reaches of the cable 7 and the side plates 3 which are connected together at the hitch points 8, my drag scraper bucket is enabled to operate readily and efficiently no matter whether the digging edge 1 or 2 is lowermost.

I do not intend to be limited in the scope of my invention save as the prior art and the attached claims may require.

I claim:

1. A drag scraper having two converging digging edges, and a cable for pulling said drag scraper forward attached to the front end of said scraper at a point located in the center plane of the scraper and substantially half-way between a plane passed through the center of gravity of the scraper and another plane passed through that digging edge of the scraper which is down.

2. A drag scraper having two converging digging edges, cables attached to both ends on the center plane of said drag scraper, said drag scraper being so constructed that a horizontal plane from the connection of said cable at the front of said drag scraper is approximately half-way between a horizontal plane through the center of gravity of said scraper and another horizontal plane through its lower digging edge when said lower digging edge is horizontal.

3. A drag scraper bucket of the type adapted to dig into and fill itself with the material to be conveyed and to then float with its load over the pile of material and comprising, two similar arms of V-shape vertical cross-section and having their upper and lower edges terminating in planes which converge toward the front of said bucket, side plates located at the divergent ends of said arms, a bail holding said side plates in spaced relation, and a cable for pulling said bucket forward and having divergent reaches each connected to one of said side plates in the middle line of said side plates and at a point located approximately half-way between the plane of one of said edges and a parallel plane passing through the center of gravity of the bucket.

4. An invertible, double-digging-edge scraper comprising: a drag scraper bucket having upper and lower edges each adapted to bear on the ground and each lying in a plane converging with the other edge at a point ahead of the drag scraper, substantially flat end portions perpendicular to the planes of said edges, an intermediate portion formed to provide a load-retaining recess between the upper and lower edges at the front of the bucket, and a cable for pulling said bucket forward attached to said flat end portions at the front of said bucket at a point located in the center plane of the bucket and half-way between a plane passed through the center of gravity of the bucket and another plane passed through the lower edge of the bucket, whereby the scraper will dig evenly along the entire lower edge into the material to be conveyed until said load-retaining recess is full and will then ride or float over the surface of the material conveying its load therein.

WILLIAM G. DAVENPORT.